P. W. THOMSON.
Improvement in Road-Scrapers.
No. 132,549.　　　　　　　　　　Patented Oct. 29, 1872.
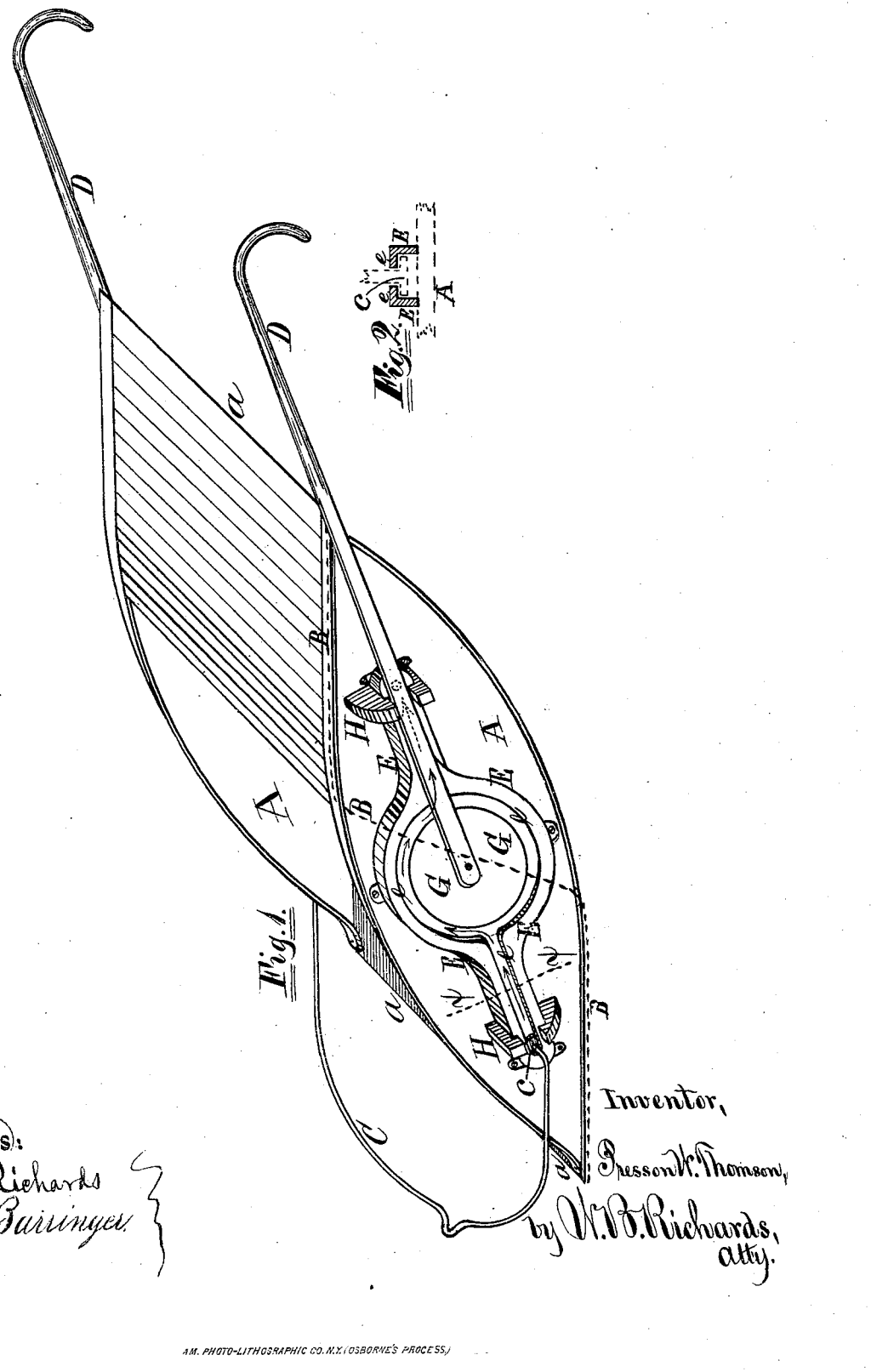

UNITED STATES PATENT OFFICE.

PRESSON W. THOMSON, OF TRURO, ILLINOIS.

IMPROVEMENT IN ROAD-SCRAPERS.

Specification forming part of Letters Patent No. 132,549, dated October 29, 1872.

*To all whom it may concern:*

Be it known that I, PRESSON W. THOMSON, of Truro, county of Knox and State of Illinois, have invented certain Improvements in Road-Scrapers, of which the following is a specification:

Nature and Objects of the Invention.

The nature of my invention relates to improvements in that class of revolving scrapers which are sharpened and prepared for scraping at each end, and provided with a double dirt-box for receiving and carrying the dirt at either end; and the invention consists in the arrangement of devices for connecting the bail to the scraper in such manner as to bring the attachment of the bail thereto always near the forward working or scraping end of the machine.

Description of the Accompanying Drawing.

Figure 1 is a perspective view of my invention. Fig. 2 is a section of a part of Fig. 1 on the line $x$ $x$.

General Description.

A represents the scraper, the side pieces of which are formed as plainly shown at Fig. 1. It has a scraping or cutting edge, $a$ $a$, at each end, and the bottom, following the course of the dotted line B, will produce a dirt-receiver at each end. C is the bail or draft-bar, and D D are the handles. E E are plates attached to each side of the scraper, formed so as to make continuous grooves or channels on the sides of the box, extending horizontally toward and near to the points of the scrapers and circular toward the center, around the disks G, as shown at Fig. 1, and having flanges $e$ $e$ projecting inward, as shown at Fig. 2. G is a disk attached to the side of the scraper between the curved parts of the plates E E. H H are latch-catches, one at each end of the plates E E, as shown at Fig. 1. $c$ $c$ are buttons on the ends of the bail C, which operate under the flanges $e$ $e$, as shown at Fig. 2. The handles D D are pivoted to the center of a disk, G, on each side of the scraper.

The operation is as follows: While the handles are in the position in the recesses of the catches H, as shown at Fig. 1, the machine will be held in working position. By separating the handles at the rear end they will be released from the catches and the scraper allowed to revolve, the ends of the bail following the track shown by the arrows and resting again near the forward end of the scraper for the draft at the next end, the handles engaging with the catch on the other end and again holding the scraper securely in working position.

Claim.

The flanged plates E E, constructed, as shown and described, so as to form a groove horizontal at the end and circular in the middle, in combination with the bail C and disk G, for the purpose specified.

PRESSON W. THOMSON.

Witnesses:
GEORGE MILLEN,
J. J. TUNNICLIFF.